United States Patent
Ezaki et al.

(10) Patent No.: US 7,036,527 B2
(45) Date of Patent: May 2, 2006

(54) COMPOSITE VALVE

(75) Inventors: Hiroyuki Ezaki, Tokyo (JP); Kazuhiko Watabe, Tokyo (JP)

(73) Assignee: Fujikoki Corporation, Tokyo (JP)

(*) Notice: Subject to any disclaimer, the term of this patent is extended or adjusted under 35 U.S.C. 154(b) by 184 days.

(21) Appl. No.: 10/819,212

(22) Filed: Apr. 7, 2004

(65) Prior Publication Data

US 2004/0211477 A1    Oct. 28, 2004

(30) Foreign Application Priority Data

Apr. 24, 2003  (JP)  ............................. 2003-119863
Aug. 29, 2003  (JP)  ............................. 2003-305871

(51) Int. Cl.
*F16K 11/18* (2006.01)

(52) U.S. Cl. .................................. 137/881; 62/525
(58) Field of Classification Search ................ 137/877, 137/879, 881; 62/525
See application file for complete search history.

(56) References Cited

U.S. PATENT DOCUMENTS 2,997,063 A  *  8/1961  Anderson et al. ........... 137/607
4,644,972 A  *  2/1987  Perrott ........................ 137/883
4,699,176 A  * 10/1987  Paddock ...................... 137/885

FOREIGN PATENT DOCUMENTS

JP     2001-124440 A1    5/2001
JP     2002-115937 A1    4/2002

* cited by examiner

*Primary Examiner*—John Fox
(74) *Attorney, Agent, or Firm*—Rader, Fishman & Grauer PLLC

(57) ABSTRACT

Disclosed is a composite valve comprising a valve body that is provided integrally with a solenoid valve portion and a differential pressure valve portion. The valve body is formed with an upper valve chest, a lower valve chest, a refrigerant introduction chamber that communicates with the upper valve chest and has a differential pressure valve seat, and a back pressure introduction chamber that communicates with the lower valve chest. A main valve element that is opened and closed by means of the solenoid valve portion is located between the upper valve chest and the lower valve chest. A differential pressure valve element that is opened and closed by means of a differential pressure between the refrigerant introduction chamber and the back pressure introduction chamber is located between these two chambers. The refrigerant introduction chamber, back pressure introduction chamber, and differential pressure valve element are arranged so as not be situated on the outer surface of the valve body.

13 Claims, 15 Drawing Sheets

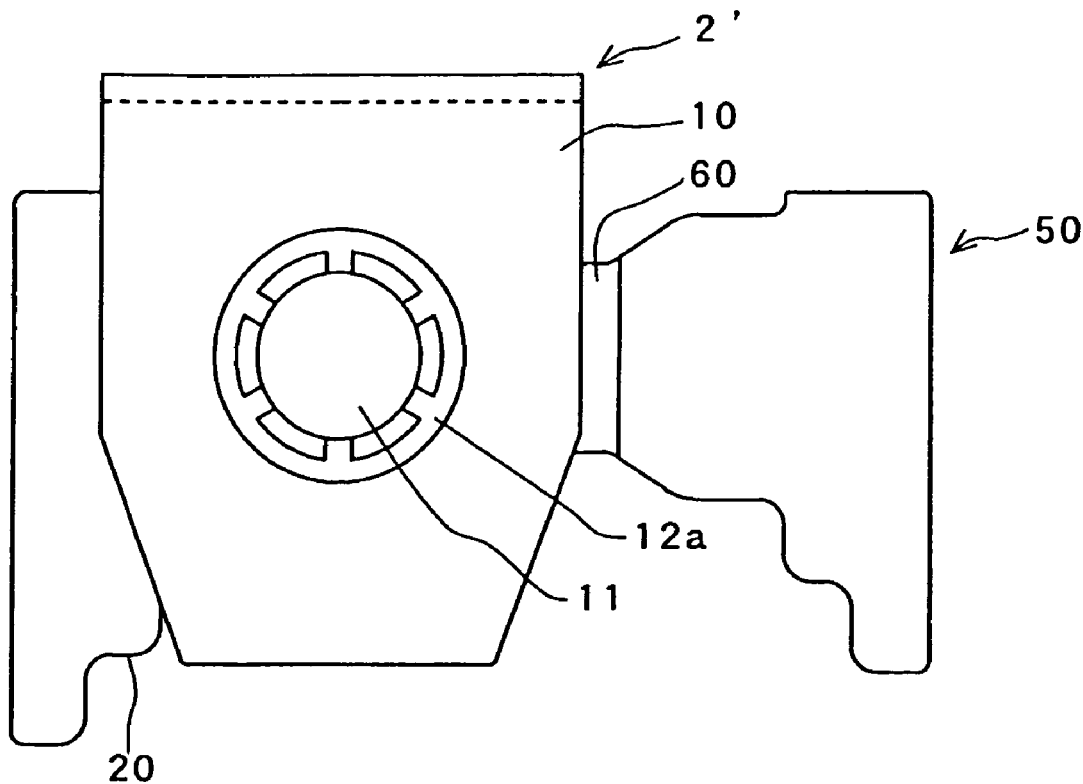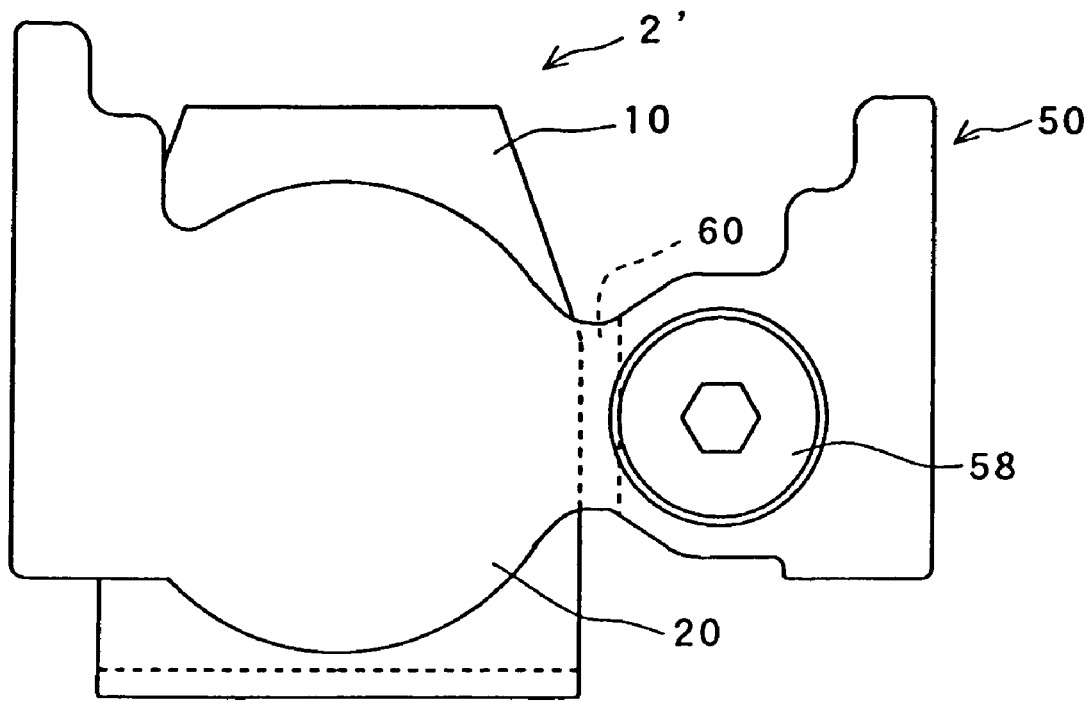

COMPOSITE VALVE

BACKGROUND OF THE INVENTION

1. Field of the Invention

The present invention relates to a composite valve used in an air conditioning system with a hot-gas defrosting cycle or the like, and more particularly, to a composite valve formed of a solenoid valve portion and a differential pressure valve portion, and to a composite valve formed of a solenoid valve portion, differential pressure valve portion, and check valve.

2. Description of the Related Art

There is proposed an air conditioning system that uses a high-temperature, high-pressure gaseous refrigerant (hot gas) in a refrigerating cycle, thereby enjoying improved heating start-up ability in the initial stage of air conditioning. A composite valve described in Japanese Patent Application Laid-Open No. 2001-124440 or 2002-115937 may be used in the refrigerating cycle for this air conditioning system.

The conventional composite valve, however, is bulky and complicated in configuration, since it combines a solenoid on-off valve and a differential pressure valve. Thus, its manufacturing man-hour and machining cost tend to increase. According to the one described in Japanese Patent Application Laid-Open No. 2001-124440, moreover, elements that constitute the differential pressure valve are exposed to the outside, so that refrigerant leakages may be caused in some cases.

SUMMARY OF THE INVENTION

Accordingly, the object of the present invention relates to provide a composite valve, having a simple small valve configuration and capable of being manufactured with reduced man-hour and at restricted cost.

A composite valve according to the present invention is a composite valve, which comprises a valve body provided integrally with a solenoid valve portion and a differential pressure valve portion. The valve body is formed with an inlet, a first outlet, a second outlet, an upper valve chest communicating with the inlet and having a main valve seat, a lower valve chest communicating with the first outlet, a refrigerant introduction chamber communicating with the upper valve chest and having a differential pressure valve seat, and a back pressure introduction chamber communicating with the lower valve chest. A main valve element, which is opened and closed by means of the solenoid valve portion, is located between the upper valve chest and the lower valve chest. A differential pressure valve element, which is opened and closed by means of a differential pressure between the refrigerant introduction chamber and the back pressure introduction chamber, is located between the chambers. The refrigerant introduction chamber, the back pressure introduction chamber, and the differential pressure valve element, which constitute a differential pressure valve portion, is configured not to be situated on the outer surface of the valve body.

The composite valve according to the invention may assume the following aspects.

The first outlet, back pressure introduction chamber, differential pressure valve element, refrigerant introduction chamber, and second outlet are arranged substantially on a straight line in the valve body, in the order named.

The valve body contains a check valve portion such that the refrigerant introduction chamber and a downstream-side outlet of the check valve portion communicate with each other. The differential pressure valve portion is formed with a throttle portion at its outlet.

The check valve portion is attached to the solenoid valve portion and the differential pressure valve portion with the aid of heat insulating means. The heat insulating means is a slit with a given width.

The main valve element defines a pilot valve chest in the upper valve chest, the pilot valve chest containing an upper valve seat formed on the top of the main valve element and a pilot valve element, which is caused to touch and leave the upper valve seat by the solenoid valve portion. The main valve element is formed with a main valve element pressure equalizing hole that internally connects the upper valve chest and the pilot valve chest.

The differential pressure valve portion includes restraining means for restraining excessive deformation of a diaphragm constituting the differential pressure valve element. The restraining means is formed of a stopper member of a metallic or plastic material. The stopper member is formed of a plurality of wings. The stopper member is formed with a slit. Further, the restraining means is integral with the valve body and defines in the valve body a hole that communicates with the second outlet.

According to the present invention arranged in this manner, two solenoid valves that are conventionally required may be replaced with a single composite valve. Thus, the parts cost and power consumption can be lowered, and the number of essential parts can be cut to ensure a reduction in cost. In consequence, the valve configuration cannot be large-sized, the construction of the composite valve can be simplified, and the entire system can be reduced in weight.

Further, the manufacturing man-hour can be reduced to lower the machining cost. Since components that constitute the differential pressure valve are not exposed to the outside, moreover, there is no possibility of a refrigerant leaking out. Furthermore, the general configuration of the refrigerating cycle to which the composite valve is applied can be simplified.

Besides, the main valve element pressure equalizing hole serves to equalize the pressures in the upper valve chest and the pilot valve chest, thereby facilitating and smoothing the open-close action of the main valve element. Furthermore, the pressure equalizing hole allows the refrigerant in the upper valve chest to flow out quickly into the pilot valve chest, thereby making it impossible or hard for the main valve to open, if a compressor is actuated, for example, with the main valve closed so that the pressure on the main valve is suddenly changed by the compressor.

If the valve is provided with the restraining means, excessive deflection of the diaphragm can be restrained to prevent sagging or deformation of the diaphragm. Further, the durability of the diaphragm that constitutes the differential pressure valve portion can be improved. Since the restraining means is formed integrally with the valve body, moreover, the configuration and manufacture of the valve can be simplified.

BRIEF DESCRIPTION OF THE DRAWINGS

The above and other objects and features of the invention will be more apparent from the ensuing description of embodiments with reference to the accompanying drawings, in which:

FIG. 8 is a plan view of the composite valve shown in FIG. 5;

FIG. 9 is a bottom view of the composite valve shown in FIG. 5;

DESCRIPTION OF THE EMBODIMENTS

Embodiments of the present invention will now be described with reference to the accompanying drawings.

[First Embodiment]

A first embodiment will first be described with reference to FIGS. 1 to 4 and FIG. 10.

Figure 1:
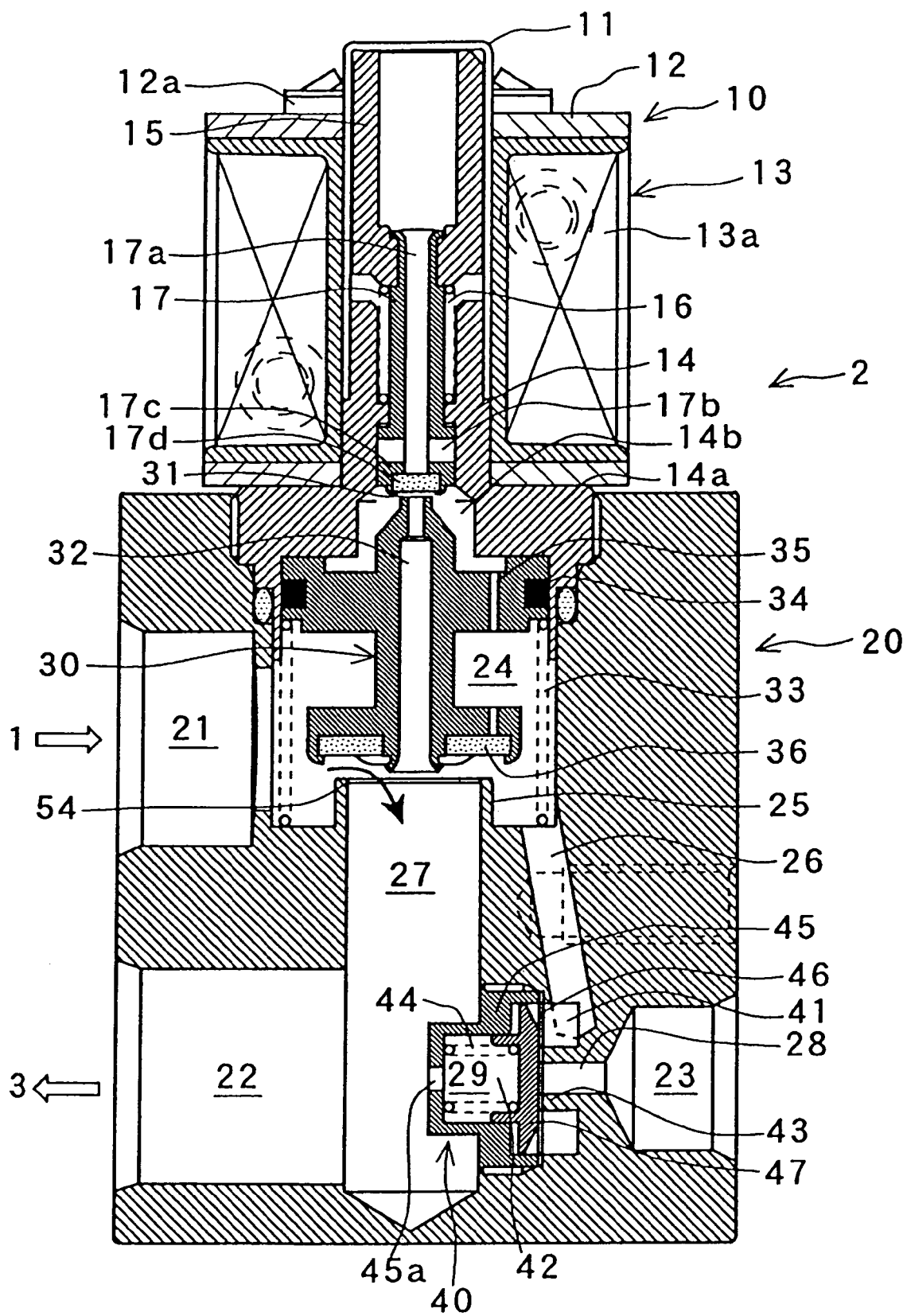
FIG. 1 is a longitudinal sectional view of a composite valve according to a first embodiment of the invention with its solenoid valve portion open.
Figure 2:
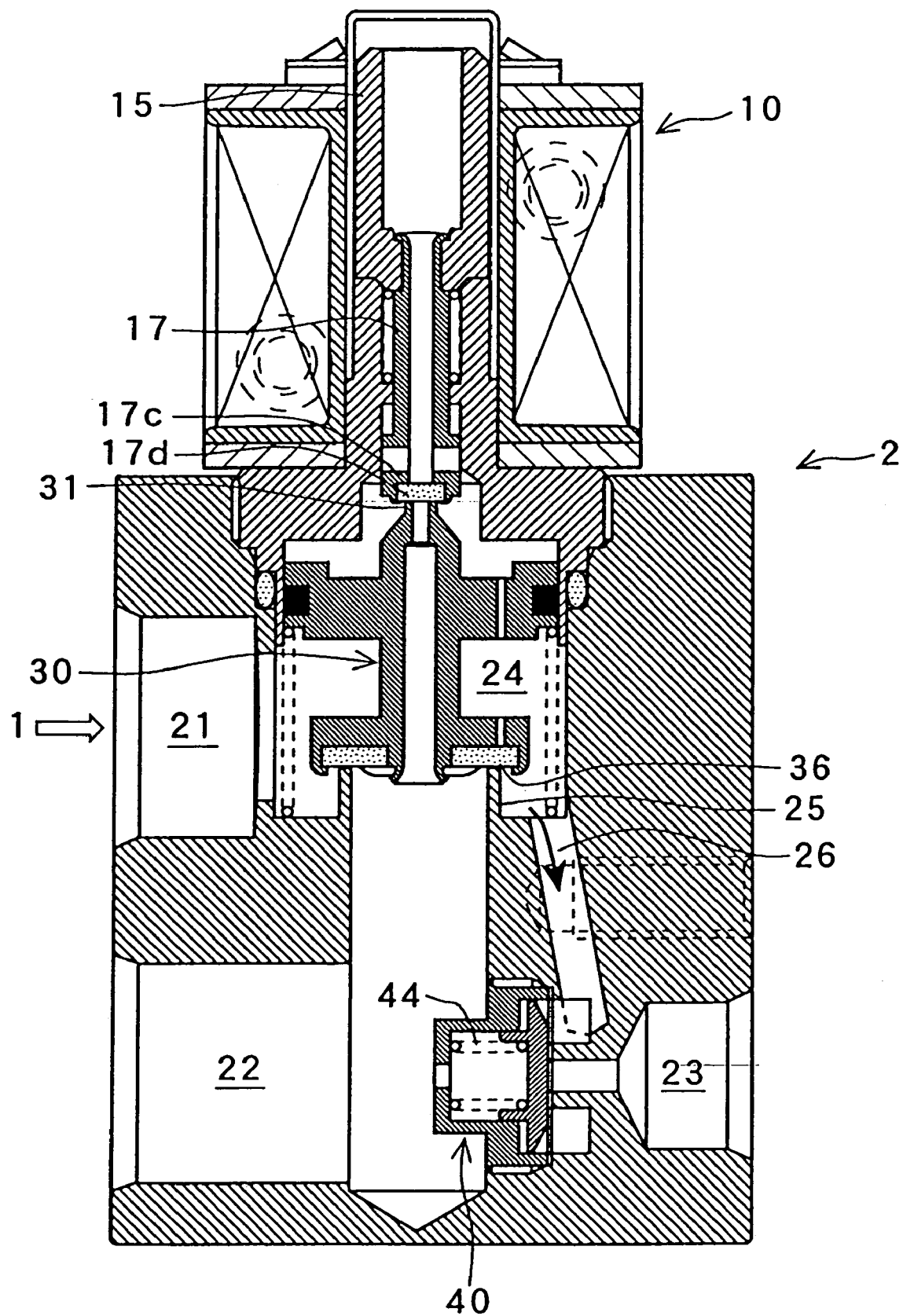
FIG. 2 is a longitudinal sectional view of the composite valve shown in FIG. 1 with both its solenoid valve portion and differential pressure valve closed.
Figure 3:
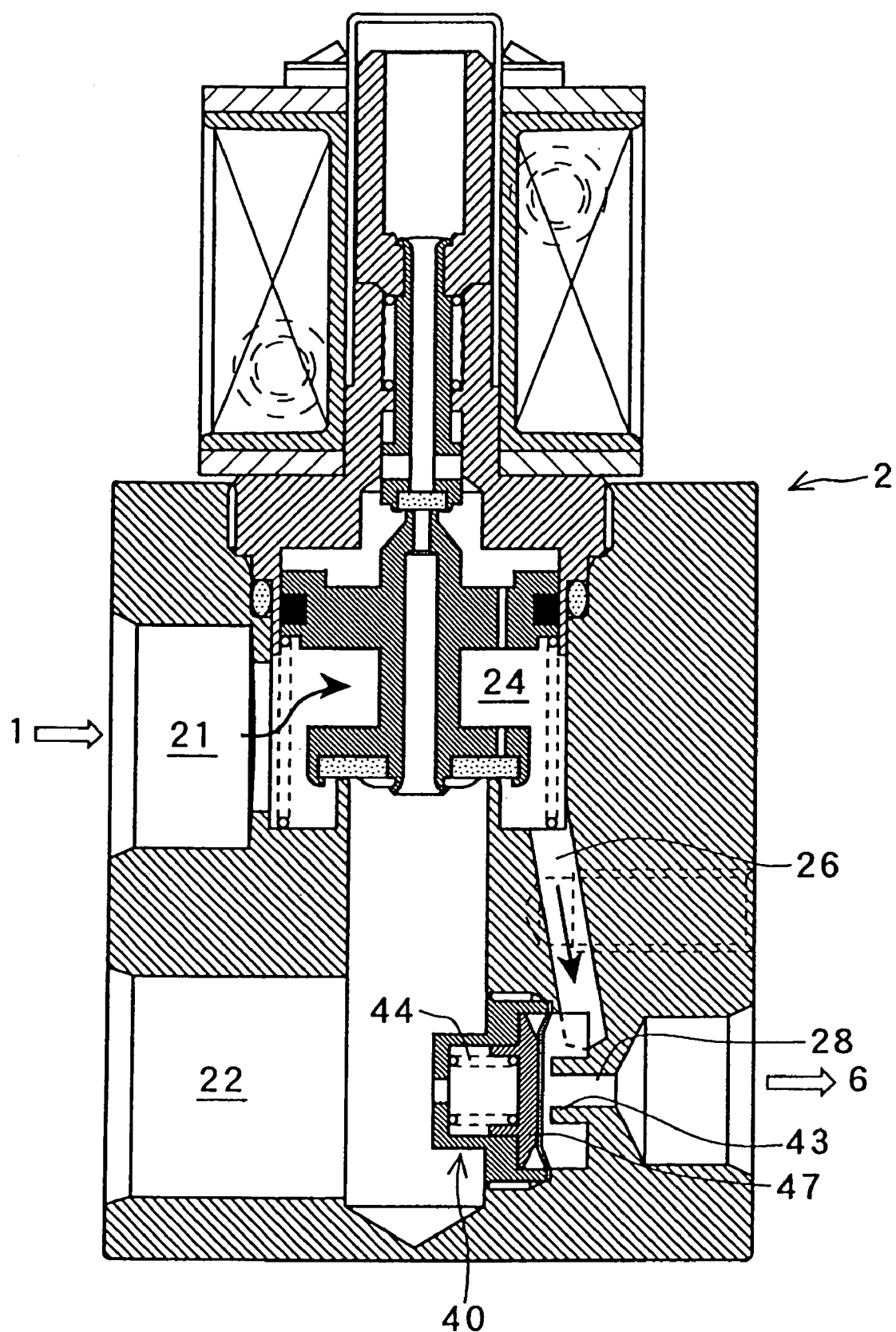
FIG. 3 is a longitudinal sectional view of the composite valve shown in FIG. 1 with its solenoid valve portion closed and its differential pressure valve open.
Figure 4:
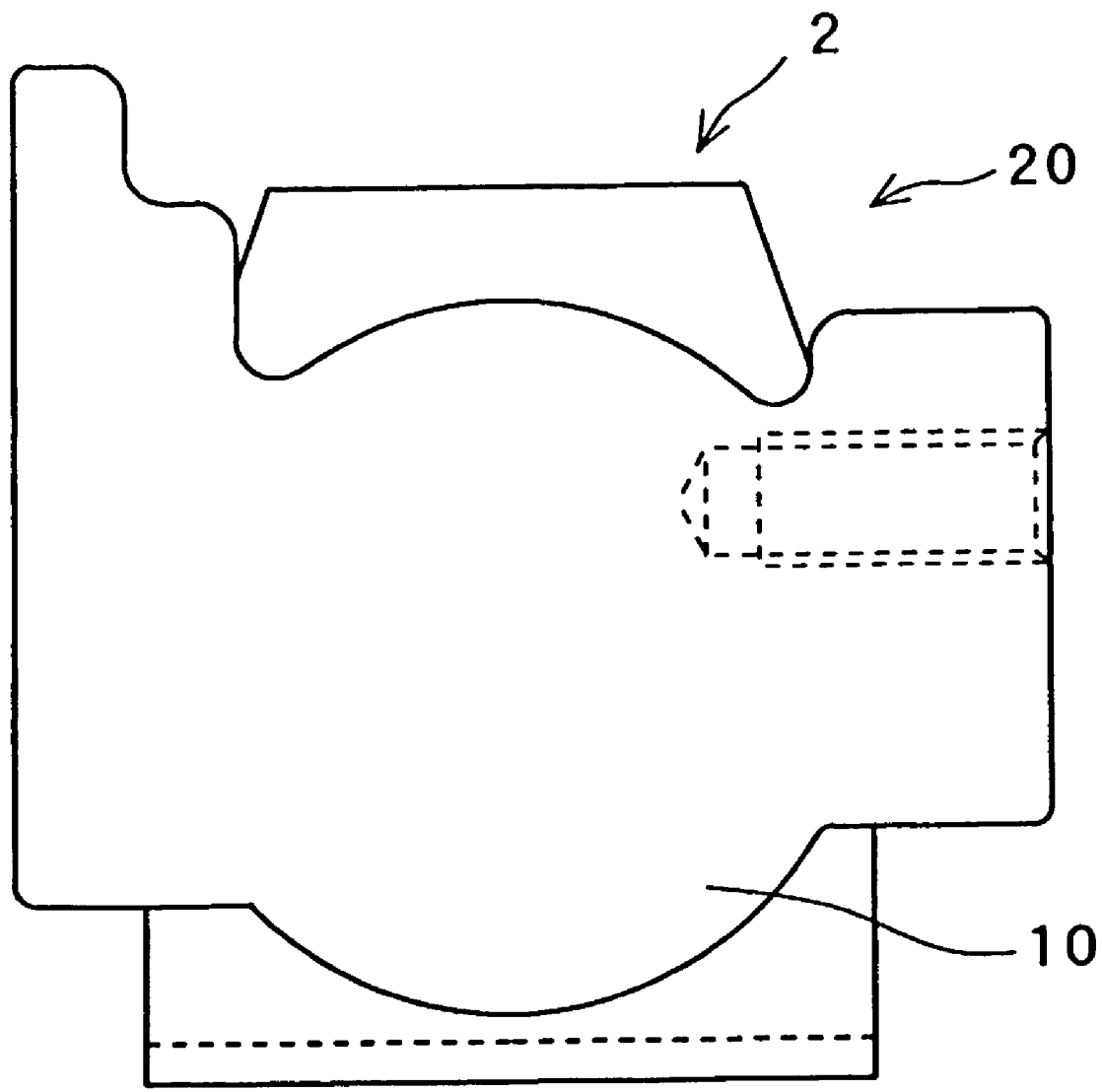
FIG. 4 is a bottom view of the composite valve shown in FIG. 1.
Figure 10:
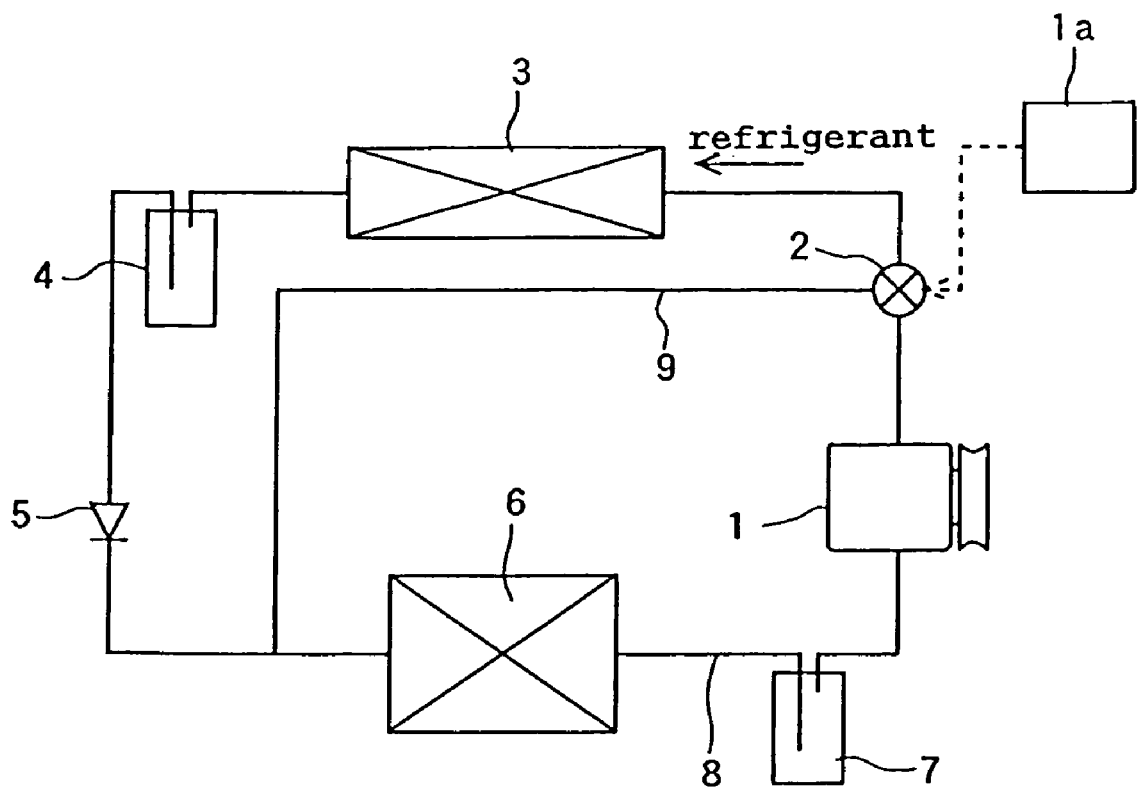
FIG. 10 is a diagram illustrating a refrigerating cycle to which the composite valve shown in FIG. 1 (first embodiment) is applied.
Figure 11:
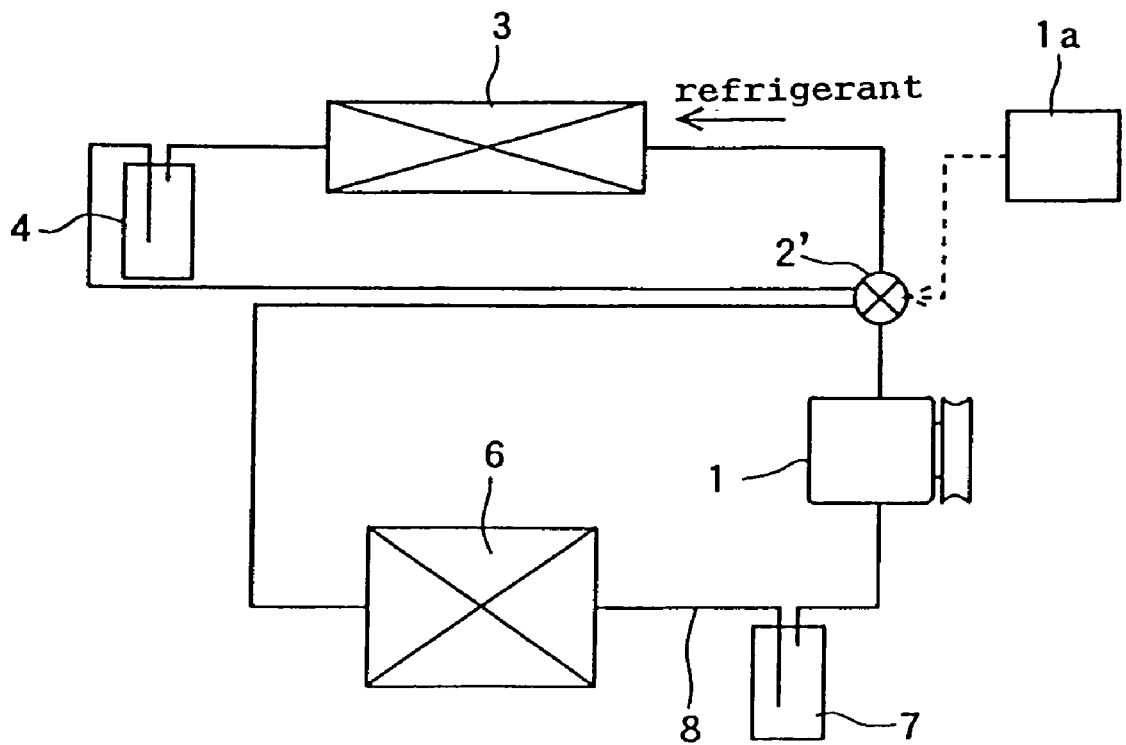
FIG. 11 is a diagram illustrating a refrigerating cycle to which the composite valve shown in FIG. 5 (second embodiment) is applied.

A composite valve 2 of the invention is applied to a refrigerating cycle that is provided with a hot-gas defrosting cycle, such as the one shown in FIG. 10. This refrigerating cycle is a conventional one, in which a compressor 1, the composite valve 2, a condenser 3, a liquid receiver 4, a check valve 5, an evaporator 6, and an accumulator 7 are coupled to one another by means of piping 8. FIGS. 1 to 3 show the composite valve used in this cycle. Further, the composite valve 2 and the piping 8 at the inlet of the evaporator 6 are coupled like a bypass by means of a bypass pipe 9.

As shown in FIG. 1, the composite valve 2 comprises a valve body 20, a solenoid valve portion 10, and a differential pressure valve portion 40. The valve portions 10 and 40 are attached to the body 20. In the solenoid valve portion 10, open-close control of a refrigerating cycle that connects the compressor 1 and the condenser 3 is carried out. The differential pressure valve portion 40 is actuated to perform open-close control of a refrigerating cycle (hot-gas cycle) between the compressor 1 and the evaporator 6 when the differential pressure between the compressor 1 and the condenser 3 becomes higher than a given pressure with a main valve element 30 of the solenoid valve portion 10 closed. The solenoid valve portion 10 is controlled for open-close action by means of a control device 1a.

The valve body 20 is provided with a refrigerant inlet 21 that connects with the compressor 1, an upper valve chest 24 that communicates with the inlet 21, and a first outlet 22 that connects with the condenser 3. Further, the valve body 20 is formed with a main valve seat 25 in the upper valve chest 24 and a lower valve chest 27 that communicates with the first outlet 22.

Furthermore, the valve body 20 is provided with a refrigerant introduction chamber 41 and a back pressure introduction chamber 42, which constitute the differential pressure valve portion 40. The chamber 41 is formed with a differential pressure valve seat 43. The refrigerant introduction chamber 41 communicates with the upper valve chest 24 by means of a communication hole 26, while the back pressure introduction chamber 42 communicates with the lower valve chest 27 through a communication hole 45a in a differential pressure valve frame 45. The back pressure introduction chamber 42 that constitutes the differential pressure valve portion 40 is screwed to a differential pressure valve chest 29, which is formed in the inner part of the first outlet 22. The valve portion 40 is located in a position where none of the outer surface of the valve body 20 is formed, whereby leakage of a refrigerant is prevented.

Further, the valve body 20 is provided with a second outlet 23 that connects with the evaporator 6. The second outlet 23 communicates with the refrigerant introduction chamber 41, which constitutes the differential pressure valve portion 40, through a communication hole 28. The workability is improved by arranging the first outlet 22, the back pressure introduction chamber 42, a differential pressure valve element 47, the refrigerant introduction chamber 41, and the second outlet 23 substantially on a straight line in the valve body 20, in the order named.

The solenoid valve portion 10 is attached to the upper valve chest 24. When it is not energized, the solenoid valve portion 10 allows the main valve seat 25 to open, thereby causing the inlet 21 and the first outlet 22 to communicate with each other. When the solenoid valve portion 10 is energized, on the other hand, the main valve element 30 closes the main valve seat 25.

The differential pressure valve element 47 of the differential pressure valve portion 40 is mounted between the refrigerant introduction chamber 41 and the back pressure introduction chamber 42. The differential pressure valve seat 43 is opened when a given value is reached by the differential refrigerant pressure between the compressor 1 and the condenser 3 with the solenoid valve portion 10 energized. By doing this, communication can be made between the inlet 21, communication hole 26, refrigerant introduction chamber 41, communication hole 28, and second outlet 23.

The composite valve 2 according to the first embodiment operates in the following manner when it is applied to a refrigerating cycle.

In cooling operation (FIG. 1), the main valve element 30 of the solenoid valve portion 10 is opened to form a normal cycle in which the refrigerant from the compressor 1 flows through the composite valve 2, condenser 3, liquid receiver 4, check valve 5, evaporator 6, and accumulator 7 and returns to the compressor 1. In heating operation, on the other hand, the solenoid valve portion 10 is energized to close the main valve element 30. The differential pressure valve portion 40 is opened to allow hot gas that is delivered from the compressor 1 to be introduced directly into the evaporator 6 when a given value is reached by the differential refrigerant pressure between the compressor 1 and the condenser 3.

The following is a detailed description of the solenoid valve portion 10.

As shown in FIG. 1, the solenoid valve portion 10 is an actuator for a pilot valve element 17c. The valve element 17c opens and closes an upper valve seat 31 that is formed on the main valve element 30. The main valve element 30 serves to connect and disconnect the inlet 21 for the refrigerant on the compressor side and the first outlet 22 for the refrigerant on the condenser side. The solenoid valve portion 10 is fixed to the valve body 20 through the lower part of a sucker 14. It is provided with a yoke 12 supported on the sucker 14, a solenoid 13 having an electromagnetic coil 13a located in the yoke 12, and a can 11 substantially in the form of a bottomed cylinder fitted on the solenoid 13. The outside of the upper part of the can 11 is fixed to the yoke 12 through a fixing member 12a.

A plunger 15 and a valve tube 17 are located in the can 11. The plunger 15 is held on the upper part of the sucker 14 with a spring 16 between them. The valve tube 17 moves up and down inside the sucker 14 as the plunger 15 moves.

The plunger 15 is fixed on the upper part of the valve tube 17, and the pilot valve element 17c is formed on the lower part of the tube 17. A valve tube axis hole 17a is formed in the axis portion of the pilot valve element 17c. A valve tube gasket 17d is attached to the bottom of the pilot valve element 17c. The valve tube 17, along with the plunger 15, moves up and down inside the sucker 14. Further, the main valve element 30 is located for vertical sliding motion on the inner peripheral surface of a flange portion 14a of the sucker 14 in the upper valve chest 24, and is urged upward by a main valve element opening spring 33. The upper valve seat 31 is formed on the upper end portion of the main valve element 30. A main valve element seal ring 34 is located around the peripheral portion of the main valve element 30. A main valve element pressure equalizing hole 35 is bored through a flange portion of the main valve element 30. The upper valve chest 24 and a pilot valve chest 14b communicate with each other through the equalizing hole 35. Further, a gasket 36 is attached to the bottom of the main valve element 30, and constitutes an abutting portion to engage the main valve seat 25.

The operation of the solenoid valve portion 10 will now be described with reference to FIGS. 1 to 3. When the solenoid valve portion 10 is open, as shown in FIG. 1, the compressor 1 is operated so that a high-temperature, high-pressure gaseous refrigerant flows through the inlet 21, upper valve chest 24, main valve seat 25, lower valve chest 27, and first outlet 22.

If the control device 1a energizes the electromagnetic coil 13a in the state shown in FIG. 1, the electromagnetic force of attraction of the electromagnetic coil 13a urges the plunger 15 to depress the spring 16. Thereupon, the valve tube 17 on the lower end of the plunger 15 engages the upper valve seat 31 on the top of the main valve element 30 as it moves the element 30 downward. In consequence, the gasket 36, which is fixed to the underside of the main valve element 30, engages the main valve seat 25 to close the valve, as shown in FIG. 2. As this is done, the lower end portion of the valve tube 17 and the respective contact areas of the gasket 36 and the main valve seat 25 are sealed, so that the high-temperature, high-pressure gaseous refrigerant can never leak out into the first outlet 22 through the inlet 21.

The pilot valve chest 14b is defined in the upper valve chest 24 by means of the main valve element 30. The pilot valve chest 14b contains the upper valve seat 31, which is formed on the top of the main valve element 30, and the pilot valve element 17c, which is caused to touch and leave the upper valve seat 31 by the solenoid valve portion 10. Further, the main valve element 30 is formed with the main valve element pressure equalizing hole 35 that connects the upper valve chest 24 and the pilot valve chest 14b. In a normal refrigerant pressure state, therefore, the main valve element 30 and the pilot valve chest 14b are equalized in pressure to facilitate and smooth the open-close action of the main valve element. Furthermore, the pressure equalizing hole 35 allows the refrigerant in the upper valve chest 24 to flow out quickly into the pilot valve chest 14b, thereby making it impossible or hard for the main valve element 30 to open, if the compressor 1 is actuated with the element 30 closed so that the pressure on the element 30 is suddenly changed by the compressor 1.

If the control device 1a de-energizes the electromagnetic coil 13a in the state shown in FIG. 2, the electromagnetic force of attraction of the coil 13a is canceled. Thereupon, the plunger 15 is pushed up by the spring 16, and the valve tube 17 that is fixed to the lower end portion of the plunger 15 moves upward. In consequence, the main valve element 30 leaves the upper valve seat 31 on its top and opens, so that the lower valve chest 27 on the condenser side and the pilot valve chest 14b communicate with each other by means of a main valve element axis hole 32 formed in the central portion of the element 30. Thereupon, the pressure in the pilot valve chest 14b changes from a high level over to a low level.

Since the upper and lower valve chests 24 and 27 are at high and low levels, respectively, an upward force that acts on the underside of the main valve element 30 increases, as compared with a downward force that acts on the pressure receiving area of the main valve seat 25. This is done because the pressure receiving area of the underside of the main valve element 30 that divides the upper valve chest 24 and the pilot valve chest 14b is larger. In consequence, the main valve element 30 moves upward, so that the gasket 36 that is fixed to the bottom of the main valve element 30 leaves the main valve seat 25, whereupon the valve opens (FIG. 1).

The following is a detailed description of the differential pressure valve portion 40.

The differential pressure valve portion 40 is located in the differential pressure valve chest 29 that is defined between the lower valve chest 27 and the second outlet 23. The valve chest 29 is divided from the refrigerant introduction chamber 41 by a diaphragm 46. The differential pressure valve frame 45, having the shape of a dish, is screwed to the differential pressure valve chest 29 defined by the diaphragm 46, on the side of the first outlet 22 and the lower valve chest 27. In consequence, the valve chests 29 and 27 are spatially divided by the valve frame 45.

The communication hole 45a is formed in the differential pressure valve frame 45. In the valve frame 45, moreover, the differential pressure valve element 47 is located in a position where it is in contact with the diaphragm 46. Further, a differential pressure coil spring 44 is interposed compressed between the valve element 47 and the valve frame 45. The elastic force of the spring 44 urges the differential pressure valve element 47 to press the diaphragm 46 against the differential pressure valve seat 43, thereby keeping the valve seat 43 closed.

The following is a description of the operation of the differential pressure valve portion 40.

When the main valve element 30 of the solenoid valve portion 10 is open with the electromagnetic coil 13a not energized, as shown in FIG. 1, the high-temperature, high-pressure gaseous refrigerant from the compressor 1 is introduced into the refrigerant introduction chamber 41 of the differential pressure valve portion 40 through the refrigerant inlet 21, upper valve chest 24, and communication hole 26. The gaseous refrigerant is also introduced into the back pressure introduction chamber 42 for differential pressure valve through the lower valve chest 27 of the valve portion 10 and the communication hole 45a.

In this state, no differential pressure is produced between the refrigerant introduction chamber 41 and the back pressure introduction chamber 42 that are divided by the diaphragm 46. Thus, the differential pressure coil spring 44 in the differential pressure valve frame 45 urges the differential pressure valve element 47 to press the diaphragm 46 against the differential pressure valve seat 43, thereby keeping the valve closed.

In an initial stage where the solenoid valve portion 10 is closed with its electromagnetic coil 13a energized, as shown in FIG. 2, the pressure in the lower valve chest 27 on the condenser side gradually shifts to a low-pressure level, so that the pressure in the back pressure introduction chamber 42 of the differential pressure valve portion 40 also shifts to a low-pressure level. Thereupon, a differential pressure starts to be produced between the refrigerant introduction chamber 41 and the back pressure introduction chamber 42 that are divided by the diaphragm 46. Since the valve opening pressure is set to a given value by means of the differential pressure coil spring 44 in the differential pressure valve frame 45, however, the differential pressure valve element 47 is pressed against the diaphragm 46 by the spring 44 before the preset pressure is reached by the valve portion 40. Thus, the diaphragm 46 abuts against the differential pressure valve seat 43, thereby keeping the valve closed.

With the passage of additional time, the differential pressure between the refrigerant introduction chamber 41 and the back pressure introduction chamber 42 for differential pressure valve is enhanced, so that a leftward force that acts on the diaphragm 46 increases and becomes higher than a given pressure, as shown in FIG. 3. Accordingly, the diaphragm 46 is pushed to the left, whereupon the differential pressure valve element 47 moves to the left. In consequence, the diaphragm 46 leaves the differential pressure valve seat 43, thereby allowing the valve to open. The preset valve opening pressure can be freely set by changing the differential pressure coil spring 44. In doing this, the spring 44 can be easily accessed through the first outlet 22.

The operation of the composite valve according to the present invention will now be described with reference to FIGS. 1 to 4.

In cooling operation, the solenoid valve portion 10 of the composite valve 2 in a refrigerant passage is open (not energized), while the differential pressure valve portion 40 is closed, as shown in FIG. 1. In this state, the refrigerant from the compressor 1 is caused to flow only toward the condenser 3. Thereupon, it circulates through the condenser 3, liquid receiver 4, check valve 5, evaporator 6, accumulator 7, and compressor 1 in the order named. Thus, the composite valve 2 does not act as a valve at all in the refrigerant passage.

FIG. 2 is a longitudinal sectional view of the composite valve 2 with the solenoid valve portion closed in a state where the differential pressure is not higher than the given value. This is a warming-up mode for heating operation. In this mode, both the main valve element 30 and the differential pressure valve portion 40 are closed so that the refrigerant flows toward neither the condenser 3 nor the evaporator 6. When the compressor 1 is operated, therefore, the refrigerant pressure is increased to a given value.

FIG. 3 is a longitudinal sectional view of the composite valve 2 with the solenoid valve portion closed in a state where the differential pressure is higher than the given value. This is a heating operation mode. In this mode, the differential pressure valve portion 40 is open and allows the refrigerant to flow toward the evaporator 6.

In this heating mode, as shown in FIG. 3, the refrigerant that is discharged from the compressor 1 passes through the inlet 21, upper valve chest 24, communication hole 26, refrigerant introduction chamber 41 of the differential pressure valve, communication hole 28, second outlet 23, and bypass pipe 9. Thereafter, the refrigerant radiates heat in the evaporator 6 and is sucked again into the compressor 1. If a request is then made to stop the heating operation, the operation is stopped.

[Second Embodiment]

A second embodiment of the invention will now be described with reference to FIGS. 5 to 9 and FIG. 11. In the description of the second embodiment to follow, the same components of the second embodiment as those of the first embodiment are denoted the same reference numerals in FIGS. 5 to 9 and FIG. 11 as those used in FIGS. 1 to 4 and FIG. 10, and description of those components is omitted here.

A composite valve 2' according to the second embodiment, which is based on the general configuration of the first embodiment, is characterized in that a check valve portion 50 is attached to a valve body 20. Its solenoid valve portion 10 and differential pressure valve portion 40 are constructed in the same manner as the ones according to the first embodiment. The valve portions 10 and 40 act without regard to the attachment of the check valve portion 50.

Figure 5:
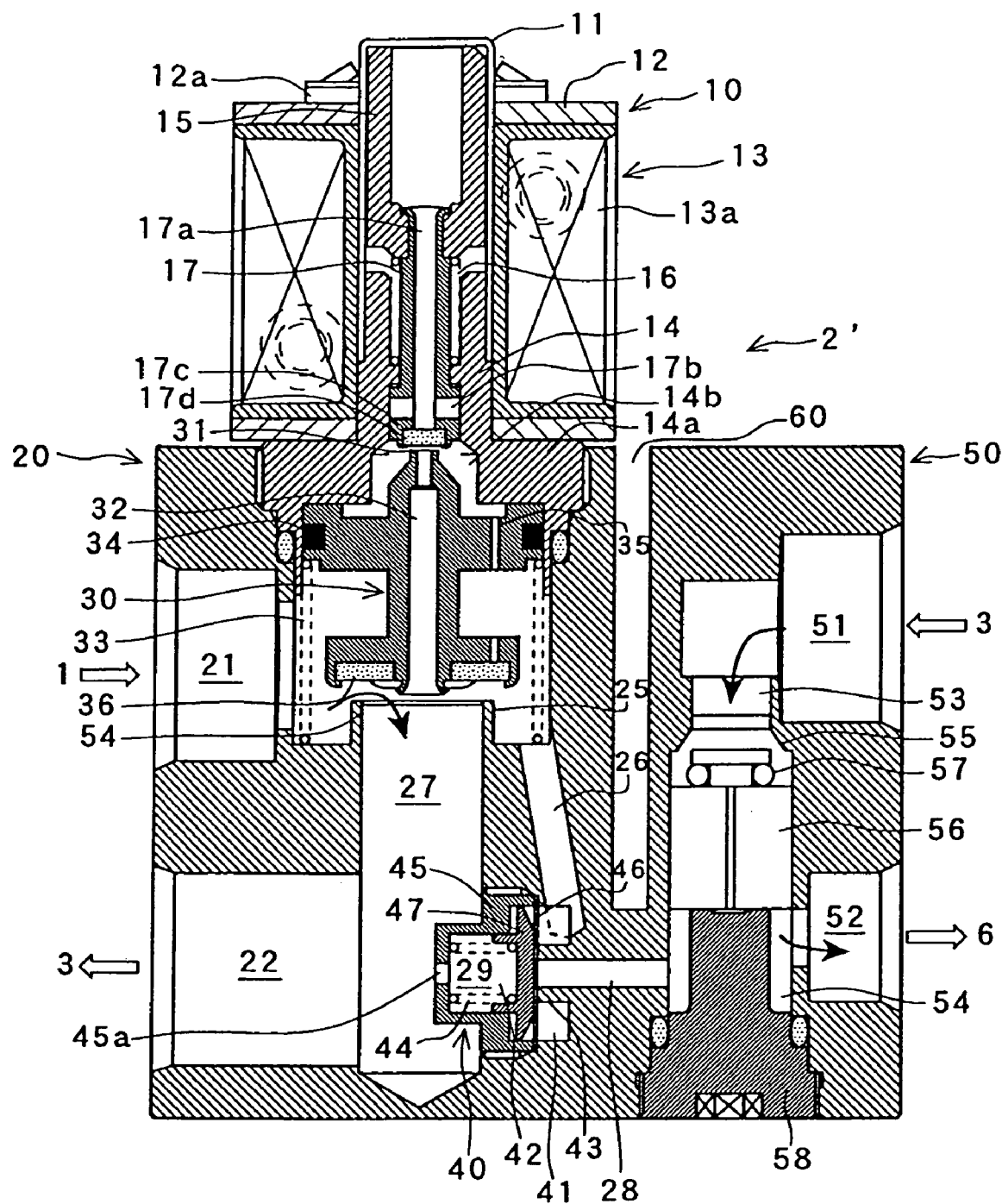
FIG. 5 is a longitudinal sectional view of a composite valve according to a second embodiment of the invention with its solenoid valve portion open.
Figure 6:
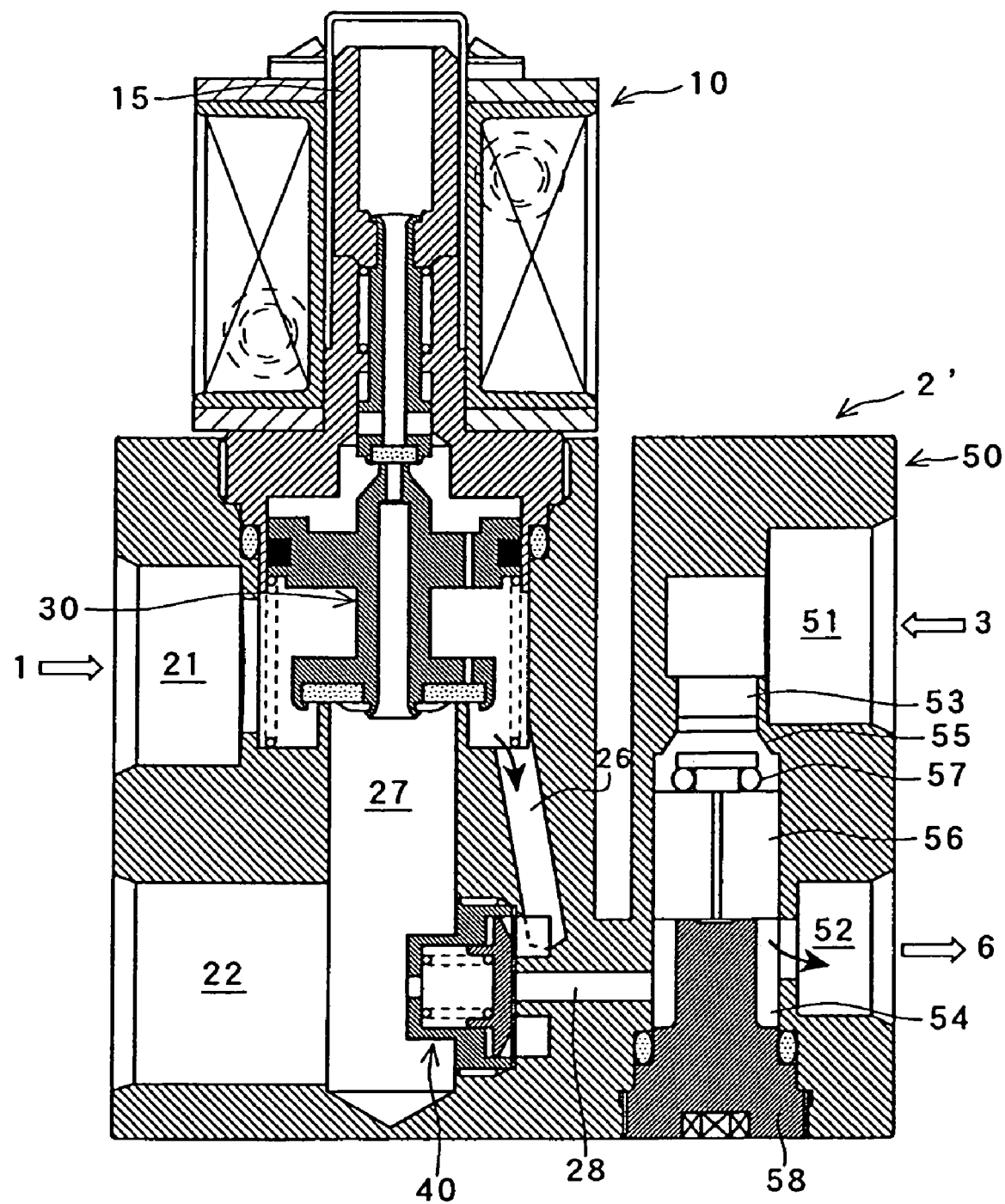
FIG. 6 is a longitudinal sectional view of the composite valve shown in FIG. 5 with both its solenoid valve portion and differential pressure valve closed.
Figure 7:
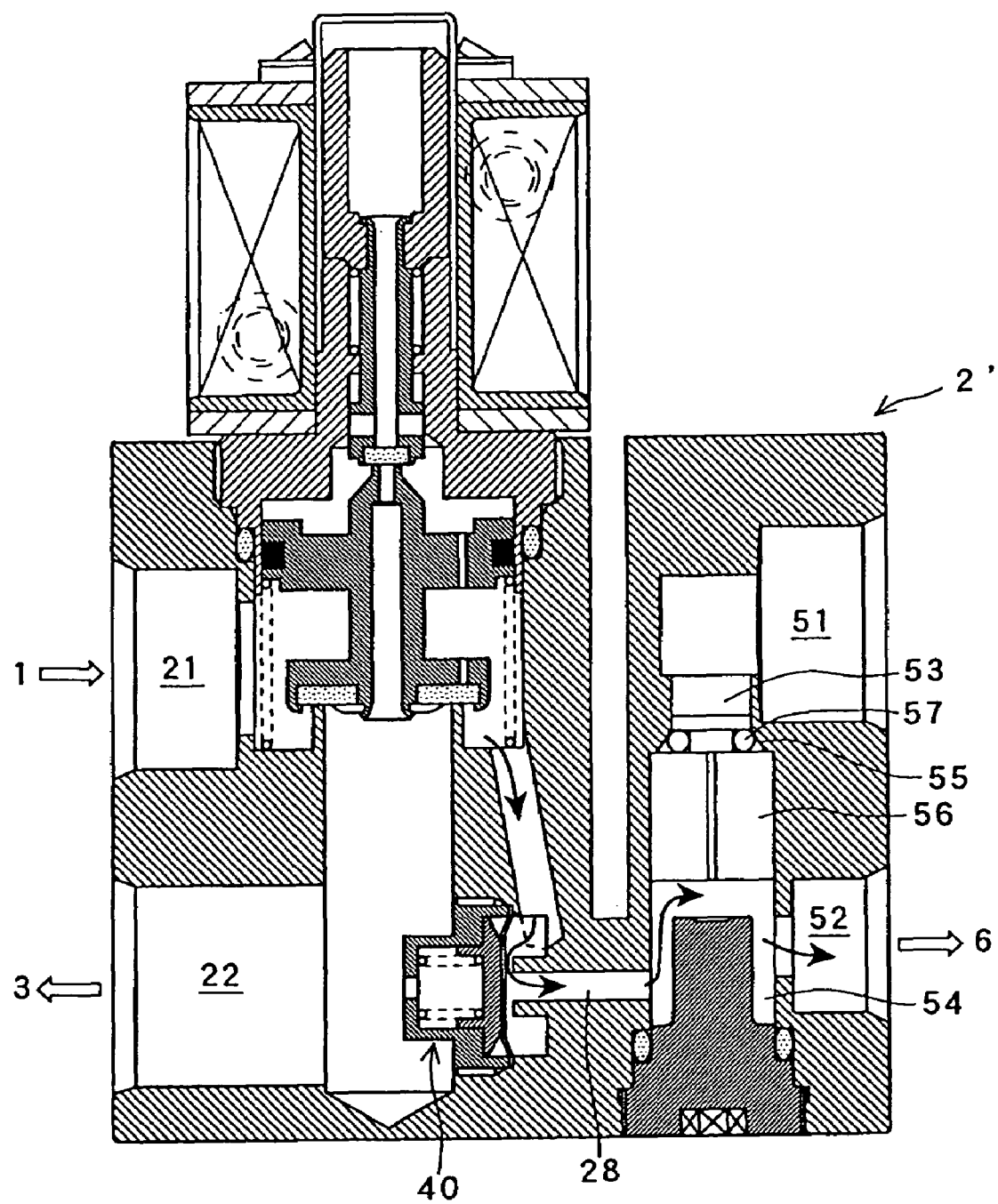
FIG. 7 is a longitudinal sectional view of the composite valve shown in FIG. 5 with its solenoid valve portion closed and its differential pressure valve open.

As shown in FIG. 5, the check valve portion 50 is formed adjacent to the solenoid valve portion 10 and the differential pressure valve portion 40. The check valve portion 50 is formed with a second inlet 51, upper check valve chest 53, lower check valve chest 54, and second outlet 52, which successively communicate with one another.

The lower check valve chest 54 is formed with a check valve seat portion 55, and a check valve element 56 is located in the valve chest 54. The check valve element 56 has a square horizontal section such that the refrigerant can easily move in the outer peripheral portion of the check valve element 56. A ring-shaped valve seat abutting body 57 is located on the check valve element 56 on the side of the check valve seat portion 55. If a refrigerant pressure higher than a given value from the side of the lower check valve chest 54 acts on the check valve element 56, the check valve element 56 moves up to engage the seat portion 55, thereby closing the valve.

The following is a description of the operation of the check valve portion 50 of the composite valve 2'.

If the refrigerant pressure from the second inlet 51 (on the side of the condenser 3) is high, the refrigerant flows in the direction of the arrow of FIG. 5, and the check valve portion 50 never acts on the refrigerant flow. In an initial stage where a main valve element 30 of the solenoid valve portion 10 is closed with an electromagnetic coil 13a energized, the pressure in a lower valve chest 27 that communicates with the condenser 3 gradually shifts to the low-pressure level, so that the pressure in a back pressure introduction chamber 42 of the differential pressure valve portion 40 gradually shifts to the low-pressure level. Thereupon, a differential pressure starts to be produced between a refrigerant introduction chamber 41 and the back pressure introduction chamber 42 that are divided by a diaphragm 46. Since the valve opening pressure is set to a given value by means of a differential pressure coil spring 44, however, a differential pressure valve element 47 is pressed against the diaphragm 46 before the preset pressure is reached by the valve portion 40. Thus, the diaphragm 46 abuts against a differential pressure valve seat 43, thereby keeping the valve closed. As this is done, the check valve portion 50 maintains the state shown in FIG. 6.

With the passage of additional time, the differential pressure between the refrigerant introduction chamber 41 and the back pressure introduction chamber 42 of the differential pressure valve portion 40 is enhanced, so that the diaphragm 46 is pressed to the left. In consequence, the differential pressure valve element 47 moves to the left, so that the diaphragm 46 leaves the differential pressure valve seat 43, thereby allowing the valve element 47 to open.

In the check valve portion 50 in this state, the refrigerant pressure in the second inlet 51 lowers, while the refrigerant pressure in a communication hole 28 rises. In consequence, the check valve element 56 is pushed up. Accordingly, the valve seat abutting body 57 abuts against the check valve seat portion 55, whereupon the check valve portion 50 is closed. The refrigerant from the compressor 1 flows out through the solenoid valve portion 10, differential pressure valve portion 40, and second outlet 52, and flows directly into an evaporator 6. This flow is maintained until the solenoid valve portion 10 is actuated.

Since the valve body 20 is formed with a slit 60, a heat insulating portion, the check valve portion 50 prevents heat from the solenoid valve portion 10 and the differential pressure valve portion 40 and heat from the check valve portion 50 from interfering with each other. Thus, energy losses that are attributable to the integration of valve elements can be reduced.

The composite valve 2' according to the second embodiment can be used in a refrigerating cycle that is provided with a hot-gas cycle. In this refrigerating cycle, the compressor 1, composite valve 2', condenser 3, liquid receiver 4, check valve 5, evaporator 6, and accumulator 7 are coupled to one another by means of the piping 8. Further, the bypass pipe 9 (see FIG. 11) is provided between the composite valve 2' and the piping 8 at the inlet of the evaporator 6, and a throttle valve is located in the bypass pipe 9. The composite valve 2' is formed with a throttle portion (not shown) in its communication hole 28. A compact refrigerating cycle can be obtained by using the composite valve 2' according to the present invention. In this refrigerating cycle, the composite valve 2 of the first embodiment may be used in place of the composite valve 2' of the second embodiment.

The composite valve 2' of the second embodiment described above may be used in a refrigerating cycle that is provided with a hot-gas defrosting cycle. In this refrigerating cycle, the compressor 1, composite valve 2', condenser 3, liquid receiver 4, check valve 5, evaporator 6, and accumulator 7 are coupled to one another by means of the piping 8. Further, the bypass pipe 9 (see FIG. 11) is provided between the composite valve 2' and the piping 8 at the inlet of the evaporator 6. Furthermore, a throttle portion is located in the outlet (downstream) portion of the check valve 5. In this case, the check valve element 56 of the composite valve 2' is designed to have a shape allowing a throttling operation by reducing the flow area of the refrigerant. A high-integration refrigerating cycle can be obtained with use of the composite valve 2' according to the invention.

[Third Embodiment]

A third embodiment of the invention will now be described with reference to FIGS. 12 to 16.

In the description of the third embodiment to follow, the same components of the third embodiment as those of the first embodiment are denoted the same reference numerals in FIGS. 12 to 16 as those used in FIGS. 1 to 4 and FIG. 10, and description of those components is omitted here.

Figure 16:
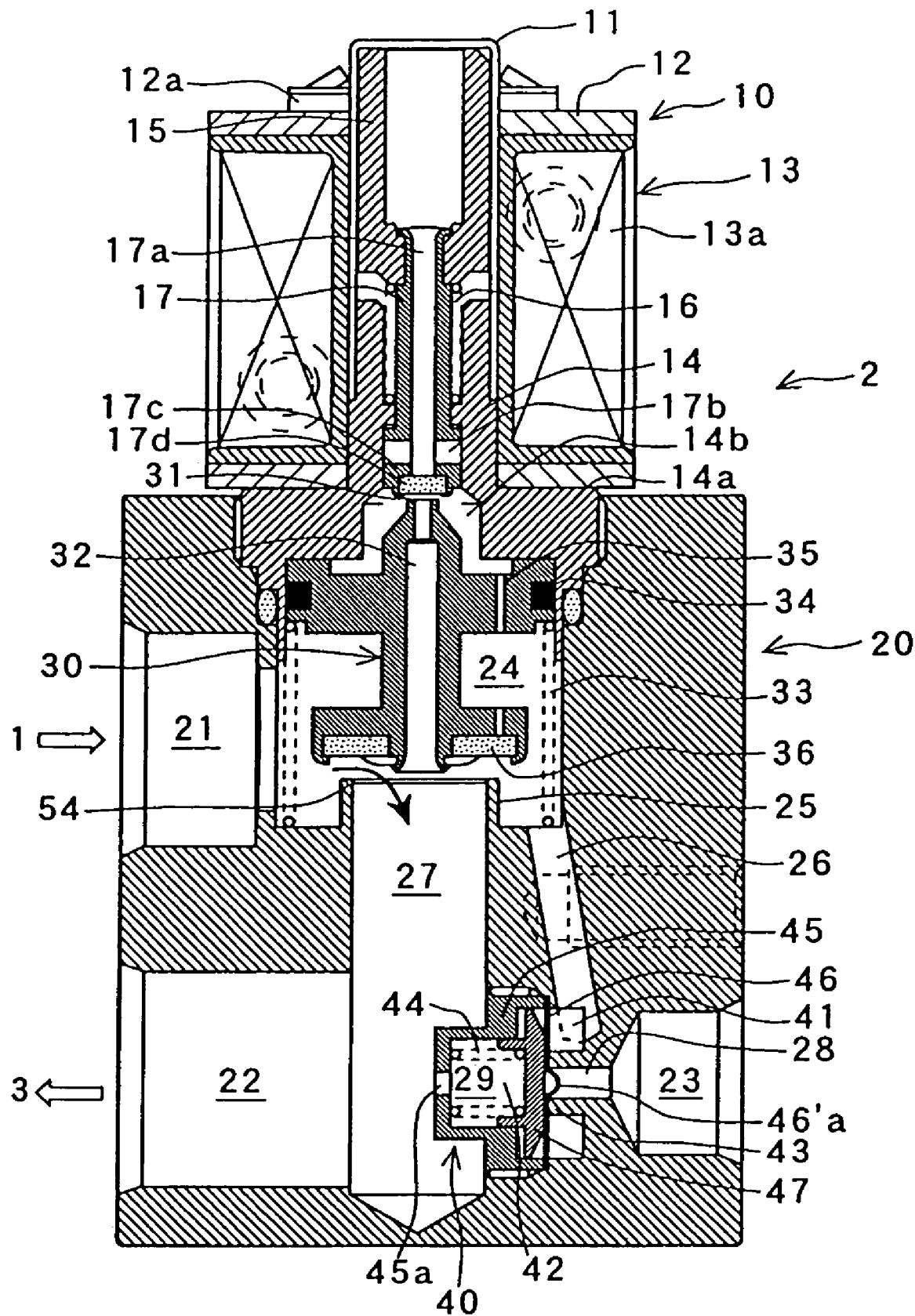
FIG. 16 is a longitudinal sectional view showing a modification of a diaphragm in the composite valve (first embodiment) shown in FIG. 1.

In the composite valve 2 of the first embodiment, the diaphragm 46 sometimes may bend (to form a flexure 46'a) and be deformed on the side of the communication hole 28 by a force of differential pressure from the closed differential pressure valve element 47, as shown in FIG. 16.

According to the third embodiment, deformation of a diaphragm 46' is prevented in a manner such that a stopper 70 is located in a communication hole 28' to restrain deflection of a deformed diaphragm 46'.

Figure 12:
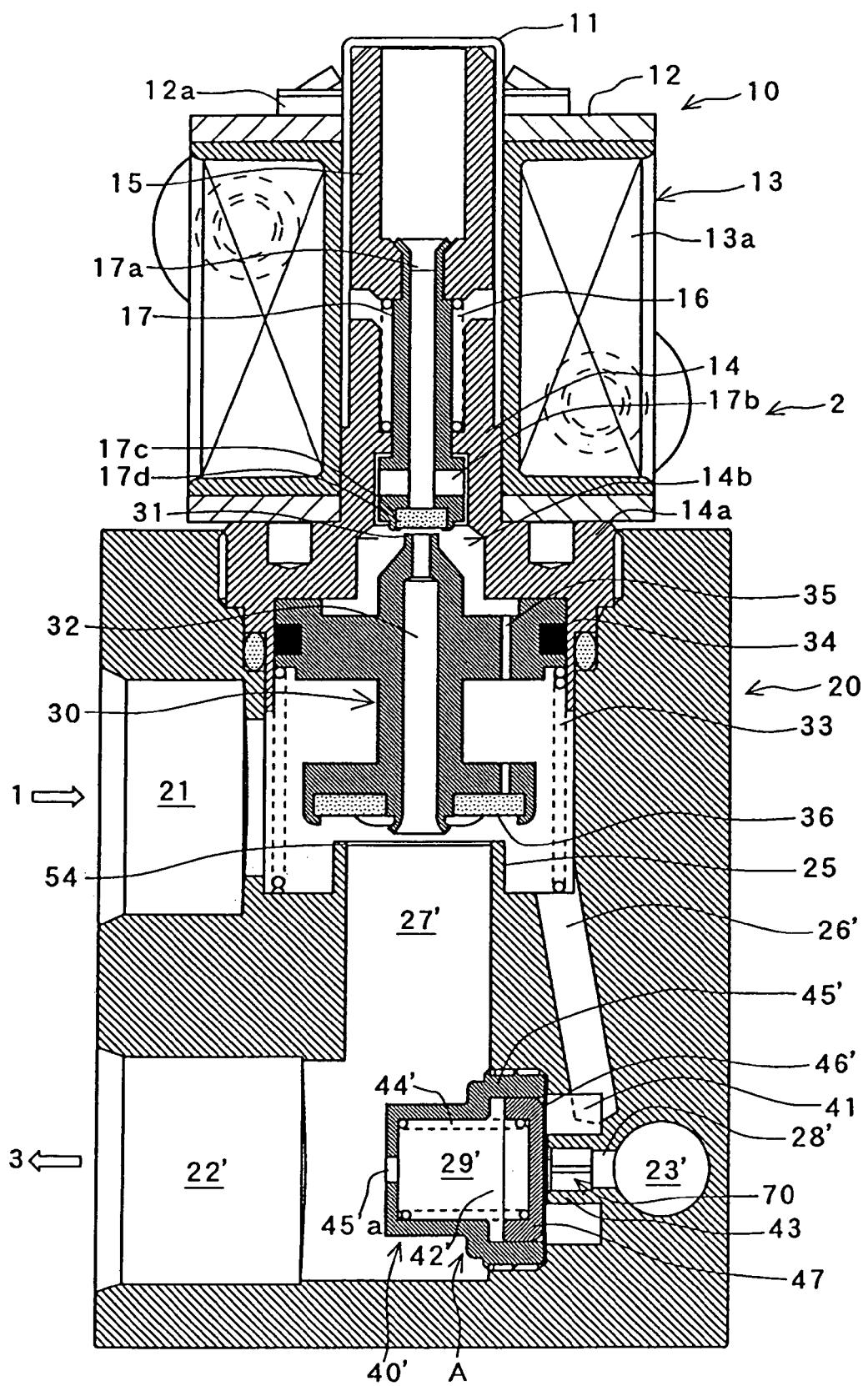
FIG. 12 is a longitudinal sectional view of a composite valve according to a third embodiment of the invention with its solenoid valve portion open.
Figure 13:
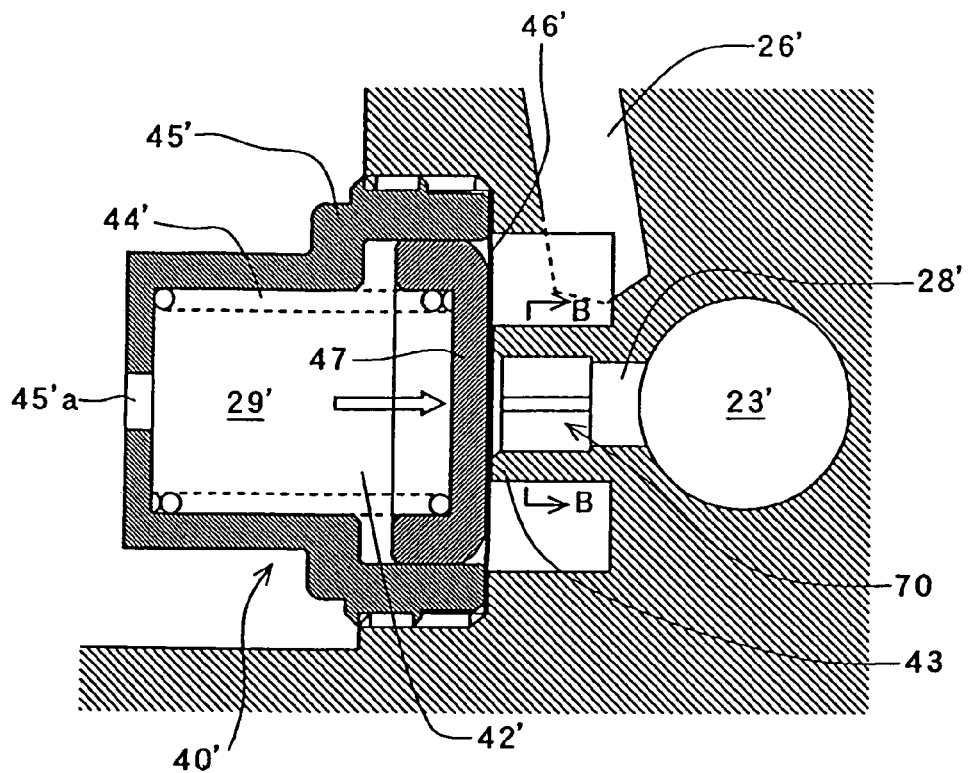
FIG. 13 is an enlarged view of a portion A of FIG. 12.

In the third embodiment, as shown in FIG. 12 or 13, a solenoid valve portion 10, valve body 20, and main valve element 30 are constructed in the same manner as the ones according to the first embodiment. A differential pressure valve element 47' of a differential pressure valve portion 40' is mounted between a refrigerant introduction chamber 41 and a back pressure introduction chamber 42'. A differential pressure valve seat 43 is opened when the given value is reached by the differential refrigerant pressure between the compressor 1 and the condenser 3 with the solenoid valve portion 10 energized. By doing this, communication can be made between an inlet 21, a communication hole 26', the refrigerant introduction chamber 41, the communication hole 28', and a second outlet 23'. The third embodiment shares this basic configuration with the first embodiment.

The differential pressure valve portion 40' is located in a differential pressure valve chest 29' that is defined between a lower valve chest 27' and the second outlet 23'. The valve chest 29' is divided from the refrigerant introduction chamber 41 by the diaphragm 46'. Further, a differential pressure valve frame 45', having the shape of a cup, is screwed to the differential pressure valve chest 29' defined by the diaphragm 46', on the side of a first outlet 22' and the lower valve chest 27'. Thus, the valve chests 29' and 27' are spatially divided by the valve frame 45'.

The differential pressure valve frame 45' is formed with a communication hole 45'a, and a differential pressure valve element 47', having the shape of a dish, is located in contact with the diaphragm 46'. A differential pressure coil spring 44' is interposed compressed between the valve element 47' and the valve frame 45'. The elastic force of the spring 44' urges the valve element 47' to press the diaphragm 46' against the differential pressure valve seat 43, thereby keeping the valve seat 43 closed.

Figure 14:
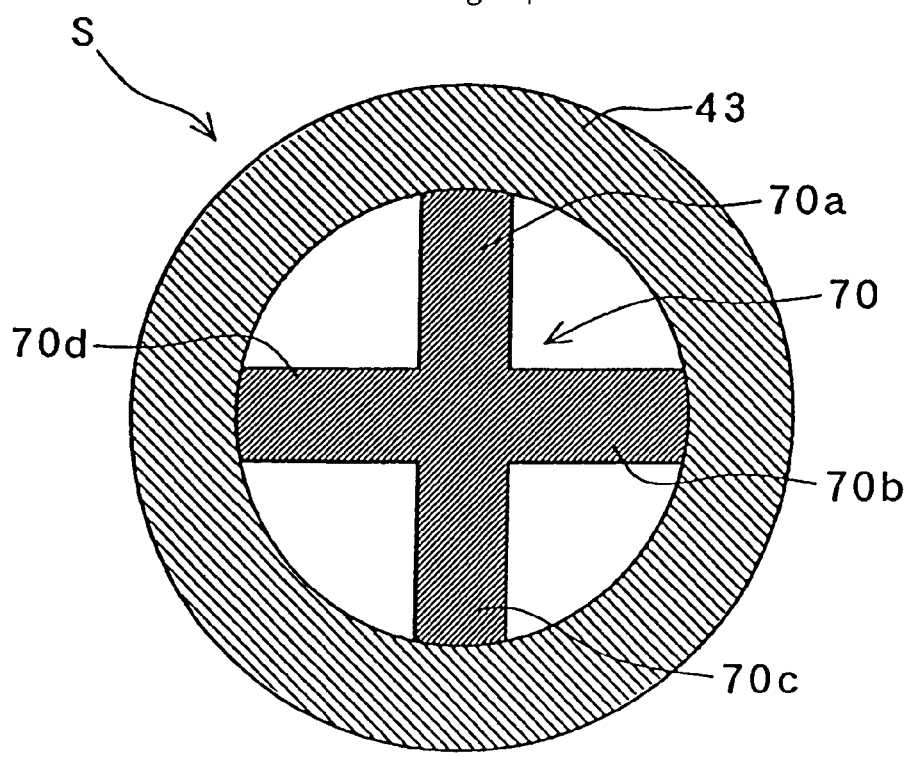
FIG. 14 is a sectional view taken along line B—B of FIG. 13.

Thus, according to the third embodiment, the stopper 70 of a given length, for use as restraining means, is press-fitted into the communication hole 28' so that it is kept at a given distance a from the diaphragm 46'. As shown in FIG. 14, the stopper 70 is formed of wings 70a, 70b, 70c and 70d and has a cruciform cross section. The cross section of the stopper 70 is made cruciform lest the stopper 70 hinder the refrigerant flow. Slits (passages) for the refrigerant flow are defined between the wings 70a, 70b, 70c and 70d that form a cruciform. The stopper 70 is formed of a metallic or plastic material.

The wings of the stopper 70 may be three in number, instead of four. Alternatively, the stopper 70 may be a rod (not shown) that has a flat receiving surface on the diaphragm side and is situated corresponding to the central axis of the communication hole 28'. If the stopper 70 is unavoidably subjected to resistance, the inside diameter of the differential pressure valve seat 43 may be increased.

Figure 15:
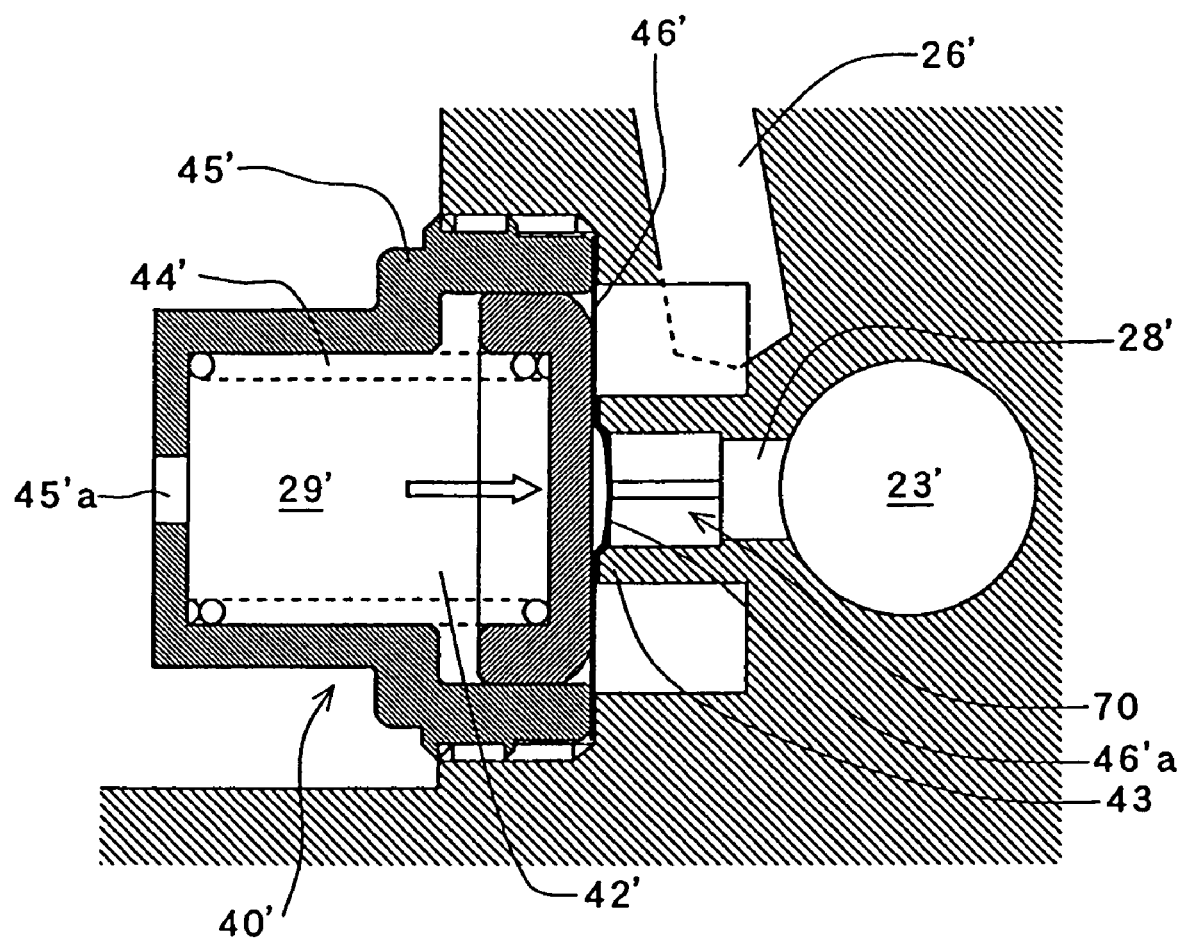
FIG. 15 is an enlarged view illustrating the operation of the composite valve shown in FIG. 12 (third embodiment)

With this arrangement, according to the third embodiment, the diaphragm 46' cannot be deformed to the degree shown in FIG. 16, although it may be bent (46'a) in the manner shown in FIG. 15. Thus, the diaphragm 46' can be prevented from being sagged or deformed.

Although the feature of the third embodiment described above is supposed to be applied to the composite valve 2 of the first embodiment, it may alternatively be applied to the composite valve 2' of the second embodiment.

[Fourth Embodiment]

A fourth embodiment of the invention will now be described with reference to FIGS. 17 and 18. In the description of the fourth embodiment to follow, the same components of the fourth embodiment as those of the third embodiment are denoted the same reference numerals in FIGS. 17 and 18 as those used in FIGS. 13 and 14, and description of those components is omitted here.

Figure 17:
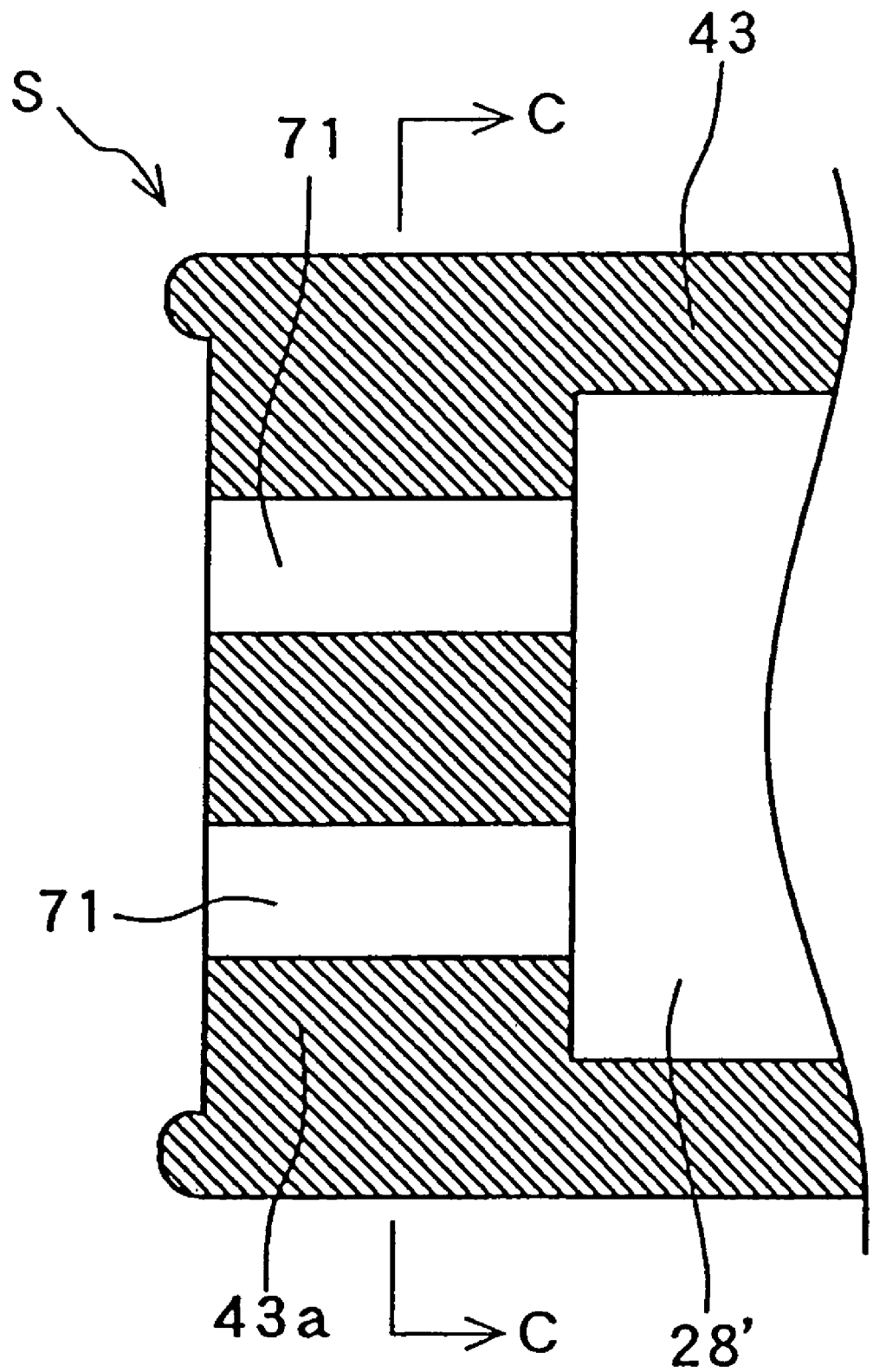
FIG. 17 is a longitudinal sectional view showing a region corresponding to restraining means of a composite valve according to a fourth embodiment of the invention.
Figure 18:
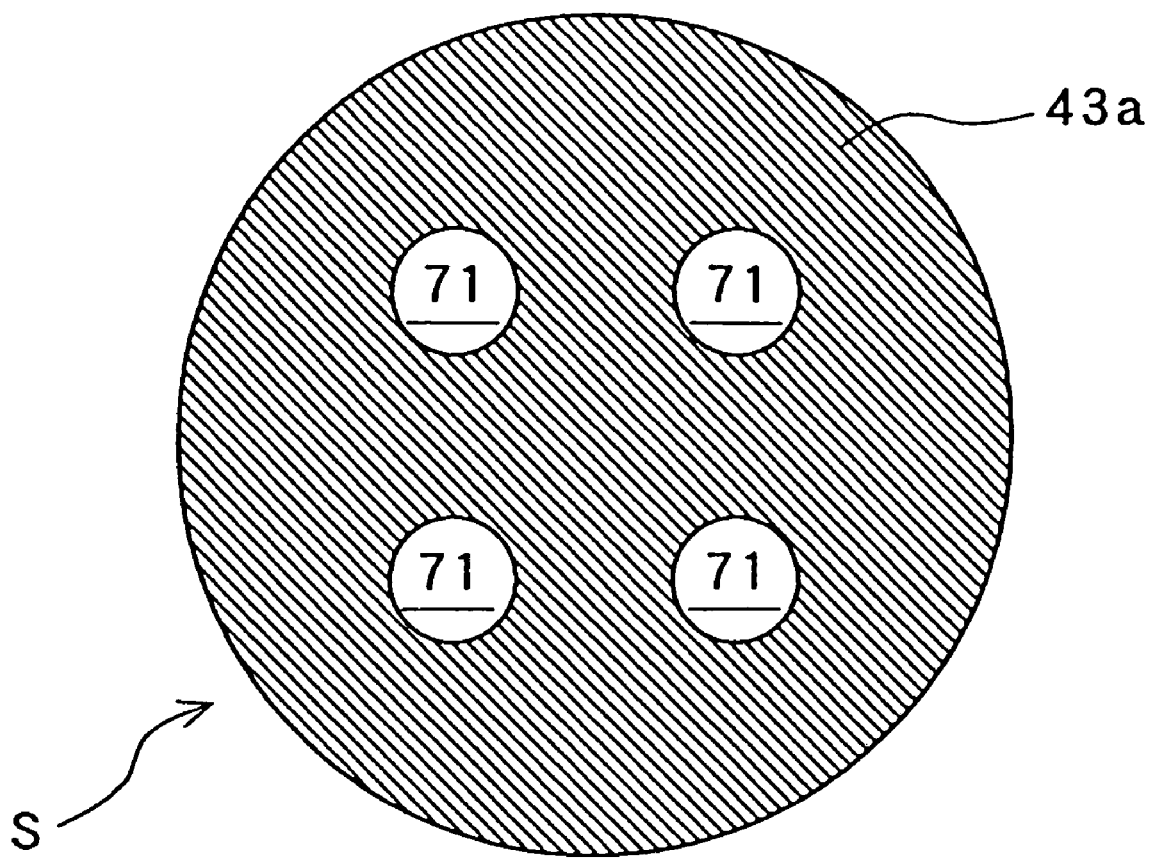
FIG. 18 is a sectional view taken along line C—C of FIG. 17.

The fourth embodiment is characterized in that restraining means 1 is formed integrally on a differential pressure valve seat 43 of a valve body 20, as shown in FIGS. 17 and 18, instead of attaching the separately formed stopper 70 to the valve seat 43 as in the third embodiment (see FIG. 14). More specifically, a columnar portion 43a is integrally formed on the differential pressure valve sheet 43 see FIG. 13) in a manner such that it is kept at a given distance corresponding to an appropriate deformation of the diaphragm 46' from the diaphragm abutting edge. Further, the columnar portion 43a is formed with a plurality of through holes 71, e.g., four in number, situated near its axis portion. The through holes 71 communicate with the second outlet 23'.

With this arrangement of the fourth embodiment, the restraining means S is simple and can be formed as the valve body 20 is manufactured, so that manufacturing means can be simplified.

Although the feature of the fourth embodiment described above is supposed to be applied to the composite valve 2 of the first embodiment, it may alternatively be applied to the composite valve 2' of the second embodiment.

What is claimed is:

1. A composite valve, having a valve body to which a solenoid valve portion and a differential pressure valve portion are integrally provided,
    wherein said valve body is formed with an inlet, a first outlet, a second outlet, an upper valve chest communicating with the inlet and having a main valve seat, a lower valve chest communicating with the first outlet, a refrigerant introduction chamber communicating with the upper valve chest and having a differential pressure valve seat, and a back pressure introduction chamber communicating with the lower valve chest;
    a main valve element, which is opened and closed by means of the solenoid valve portion, is located between the upper valve chest and the lower valve chest;
    a differential pressure valve element is located between the refrigerant introduction chamber and the back pressure introduction chamber so that the differential pressure valve element is opened and closed by means of a differential pressure between the chambers; and
    said differential pressure valve portion, which is composed of the refrigerant introduction chamber, said back pressure introduction chamber, and said differential pressure valve element, is configured not to be situated on the outer surface of the valve body.

2. The composite valve according to claim 1, wherein the first outlet, back pressure introduction chamber, differential pressure valve element, refrigerant introduction chamber, and second outlet are arranged substantially on a straight line in the valve body, in the order named.

3. The composite valve according to claim 1, wherein the valve body contains a check valve portion such that the refrigerant introduction chamber and a downstream-side outlet of the check valve portion communicate with each other.

4. The composite valve according to claim 3, wherein the check valve portion is attached to the solenoid valve portion and the differential pressure valve portion with the aid of heat insulating means.

5. The composite valve according to claim 4, wherein the heat insulating means is a slit with a given width.

6. The composite valve according to claim 3, wherein the differential pressure valve portion is formed with a throttle portion at an outlet thereof.

7. The composite valve according to claim 3, wherein the check valve portion is formed with a throttle portion at an outlet thereof.

8. The composite valve according to claim 1, wherein the main valve element defines a pilot valve chest in the upper valve chest, the pilot valve chest containing an upper valve seat formed on the top of the main valve element and a pilot valve element, which is caused to touch and leave the upper valve seat by the solenoid valve portion, and the main valve element is formed with a main valve element pressure equalizing hole internally connecting the upper valve chest and the pilot valve chest.

9. The composite valve according to claim 1, wherein the differential pressure valve portion includes restraining means for restraining excessive deformation of a diaphragm constituting the differential pressure valve element.

10. The composite valve according to claim 9, wherein the restraining means is formed of a stopper member of a metallic or plastic material.

11. The composite valve according to claim 9, wherein the restraining means is integral with the valve body and defines in the valve body a hole communicating with the second outlet.

12. The composite valve according to claim 10, wherein the stopper member is formed of a plurality of wings.

13. The composite valve according to claim 10, wherein the stopper member is formed with a slit.

* * * * *